United States Patent
Chillappa et al.

(10) Patent No.: US 9,384,654 B1
(45) Date of Patent: Jul. 5, 2016

(54) GEOLOCATION AWARENESS ITEM TRACKING

(71) Applicant: Symantec Corporation, Mountain View, CA (US)

(72) Inventors: Srinivas Chillappa, Studio City, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 35 days.

(21) Appl. No.: 14/588,360

(22) Filed: Dec. 31, 2014

(51) Int. Cl.
*G08B 1/08* (2006.01)
*G08B 25/10* (2006.01)

(52) U.S. Cl.
CPC ..................................... *G08B 25/10* (2013.01)

(58) Field of Classification Search
CPC .... H04W 4/02; G08B 13/19608; H04B 17/00
USPC ............... 340/539.13, 539.15, 539.32, 573.1, 340/573.4; 455/456.1, 404.2
See application file for complete search history.

(56) References Cited

U.S. PATENT DOCUMENTS

| | | | | |
|---|---|---|---|---|
| 7,327,262 | B2* | 2/2008 | Motteram | G06Q 10/06 235/385 |
| 8,634,813 | B2* | 1/2014 | Paschetto | G08B 21/0283 455/404.2 |
| 2004/0085207 | A1* | 5/2004 | Kreiner | G06Q 10/087 340/572.1 |
| 2005/0068169 | A1* | 3/2005 | Copley | G08B 21/0283 340/539.13 |
| 2015/0180746 | A1* | 6/2015 | Day, II | H04L 51/16 455/405 |

\* cited by examiner

*Primary Examiner* — Phung Nguyen
(74) *Attorney, Agent, or Firm* — Patent Law Works LLP (57) ABSTRACT

Locations of animate and inanimate items are tracked over time. Tracking policies concerning the items are enforced, based on detected spatiotemporal events. Multiple routers each maintain a captive network to which mobile computing devices automatically connect. Users register mobile computing devices, which are associated with items to be tracked. A backend server maintains records concerning registered mobile computing devices. Records contain identifiers of registered mobile computing devices and their associated items, as well as categorization information and tracking policies concerning the items. Over time, registered mobile computing devices are moved around, causing them to connect to and disconnect from different captive networks. These connection events are reported to the backend, which uses this data to track locations of items over time. Based on this tracking, the backend determines when specific tracking policies of specific items dictate that alerts are to be sent, and transmits alerts to target users accordingly.

22 Claims, 3 Drawing Sheets

GEOLOCATION AWARENESS ITEM TRACKING

TECHNICAL FIELD

This disclosure pertains generally to computerized location tracking, and more specifically to using captive WiFi networks and portable computing devices to track animate and inanimate items according to desired criteria.

BACKGROUND

Parents would like to be able to allow their children to move about safely within approved locations (their own yards, neighborhoods, schools, friend's houses, etc.), while ensuring that they avoid prohibited or dangerous areas, and comply with specified time parameters or other condition (get to school on time, study at the library for at least two hours, be home by 8:00). At the same time, parents find it unduly burdensome to constantly monitor their children's whereabouts and attempt to enforce these behaviors.

In addition to children, people want to be able to track the whereabouts of their pets, and have criteria as to where and when they allow their pets to be outside. For example, a dog may be allowed in the back yard, but the owner would want to know if the dog got out of the yard and was wandering down the street. A cat may be let out, be the owner wants the cat back by dark, and would be interested to know how far from home the cat goes. A hamster or other small rodent may be expected to stay in a cage or similar habitat at all times. People also wish to keep track of inanimate items, such as vehicles and portable computing devices, which are commonly moved about, as well as larger electronics, appliances, jewelry, furniture and other possessions, which are generally expected to remain within a home.

Some computerized tracking systems exist such as LoJack for cars, but these require custom installation of expensive equipment, and rely on cellular communication and a high power source such as a car battery. A specific item such as a given car can be tracked only after an expensive, large, power consuming custom apparatus is installed. Other computerized tracking systems rely on short range Bluetooth communication for transceivers attached to items to communicate with an app on a phone. This can be useful for limited functionality such as finding keys lost in the house, but is not suitable for tracking items outside of a highly localized area or according to advanced conditional criteria.

SUMMARY

Locations and behaviors of both animate and inanimate items are tracked over time. Tracking policies concerning the items are enforced, based on detected spatiotemporal events. Each of a plurality of routers maintains a captive network to which appropriately configured mobile computing devices can automatically connect. Administrative level users register mobile computing devices, which are associated with items to be tracked (e.g., mobile computing devices can be worn by, carried by or affixed to animate and inanimate items). A backend server maintains records concerning registered mobile computing devices (e.g., in a database). The records contain identifiers of the registered mobile computing devices and their corresponding associated items, as well as categorization information and tracking policies concerning the associated items. The categorization information can be gleaned automatically and/or supplied by administrative users. Default tracking policies can be supplied for different types of items, and default policies can be edited, overridden or otherwise customized. Over time, registered mobile computing devices can be moved around, causing them to connect to and disconnect from different captive networks. These connection events are reported to the backend, which uses this data to track locations of items over time. Based on this tracking, the backend determines when specific tracking policies of specific items dictate that alerts are to be sent (e.g., an item moves into a prohibited area, an item is not back to a specified area by a given time, etc.). The backend transmits alerts to target users as indicated by the tracking policies.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
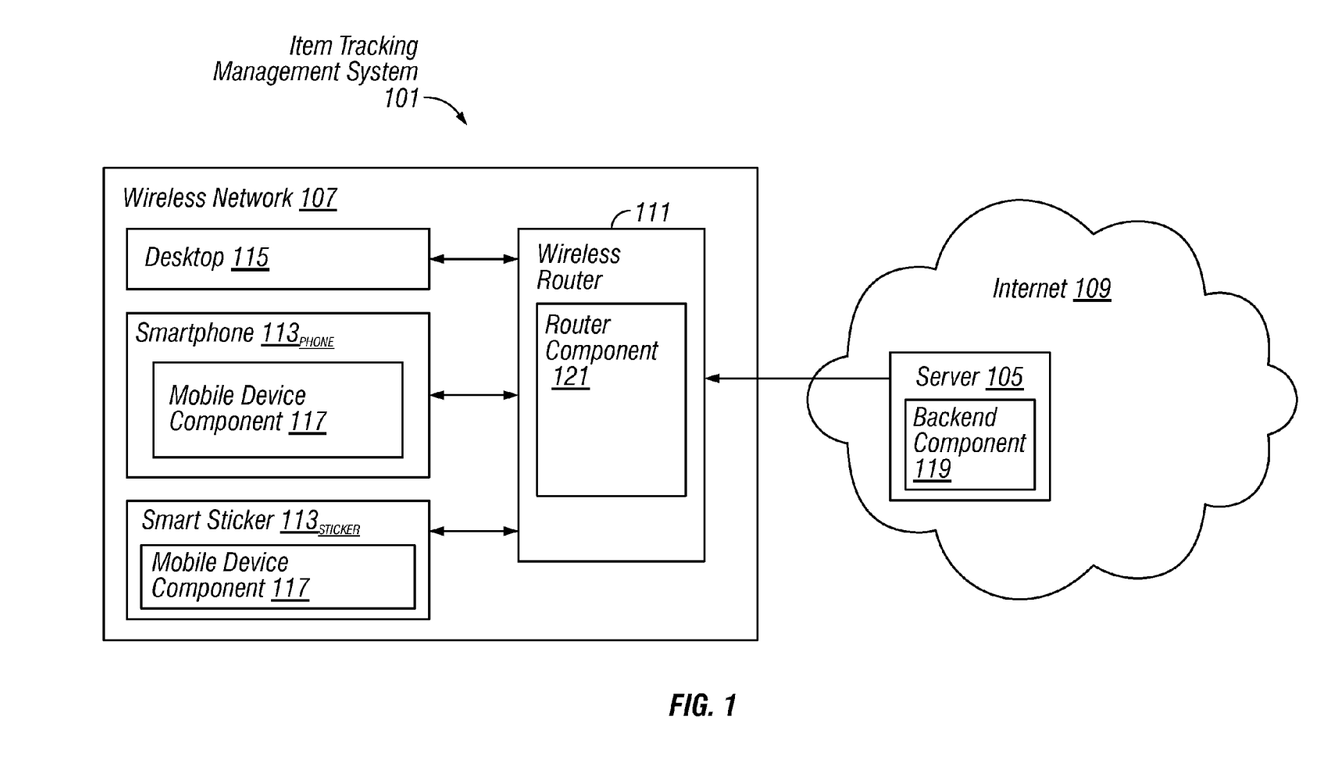
FIG. 1 is a block diagram of an exemplary network architecture in which an item tracking management system can be implemented, according to some embodiments.

FIG. 1 is a block diagram illustrating an exemplary network architecture in which an item tracking management system 101 can be implemented. The illustrated network architecture comprises a wireless local area network 107 (for example, in a home, library, school, coffee shop or other context). The illustrated wireless local area network 107 comprises multiple computers 210 which are connected to a wireless router 111, which is in turn connected the Internet 109 (or in other embodiments to a different wide area network). The computers 210 present in a local area network 107 can comprise any combination of desktop computers 115 and/or mobile computing devices 113, acting in the capacity of clients 103 and/or servers 105 as desired. A mobile computing device 113 can comprise any type of portable computer system 210 capable of connecting to a network 107 and running computer instructions. Some such mobile computing devices 113 are referred to as smartphones, although some mobile phones not so designated also have these capabilities. Tablet computers, laptop computers, hybrids, convertible laptops, smart watches, smart bracelets, other types of wearable computing devices, smart stickers, smart tiles and other types of attachable/affixable computing devices are all examples of mobile computing devices 113. Some contemporary mobile computing devices 113 are quite small, and can be easily worn, carried in a pocket or affixed/attached to an item. Some examples include smart watches, bracelets, stickers, cards, tiles, key tags, tokens and the like.

In FIG. 1, the wireless local area network 107 comprises a router 111, a desktop computer 115 and two mobile computing devices 113 (a smartphone $113_{PHONE}$ and a smart sticker $113_{STICKER}$). Although in this context these devices are typically connected to the router 111 wirelessly, it is also possible for computing devices 210 in the local area network 107 to be physically coupled to the router 111, via, e.g., Ethernet. The router 111 is in turn communicatively coupled to the Internet 109 via cable, DSL through an ISP, optical fiber, etc. In practice, more or fewer computing devices 210 can be included in a local area network 107 as desired, and devices can come in and out of wireless range or otherwise connect and disconnect over time.

In FIG. 1, a router component 121 of an item tracking management system 101 is illustrated as residing on a wireless router 111, with a mobile device component 117 residing on each mobile computing device 113 and a backend component 119 residing on a server 105 on the Internet 109. It is to be understood that this is an example only, and in different embodiments various functionalities of the components of the item tracking management system 101 can be instantiated on other types of computers 210 and/or programmable network appliances, and can be otherwise distributed between multiple computing devices as desired.

Figure 2:
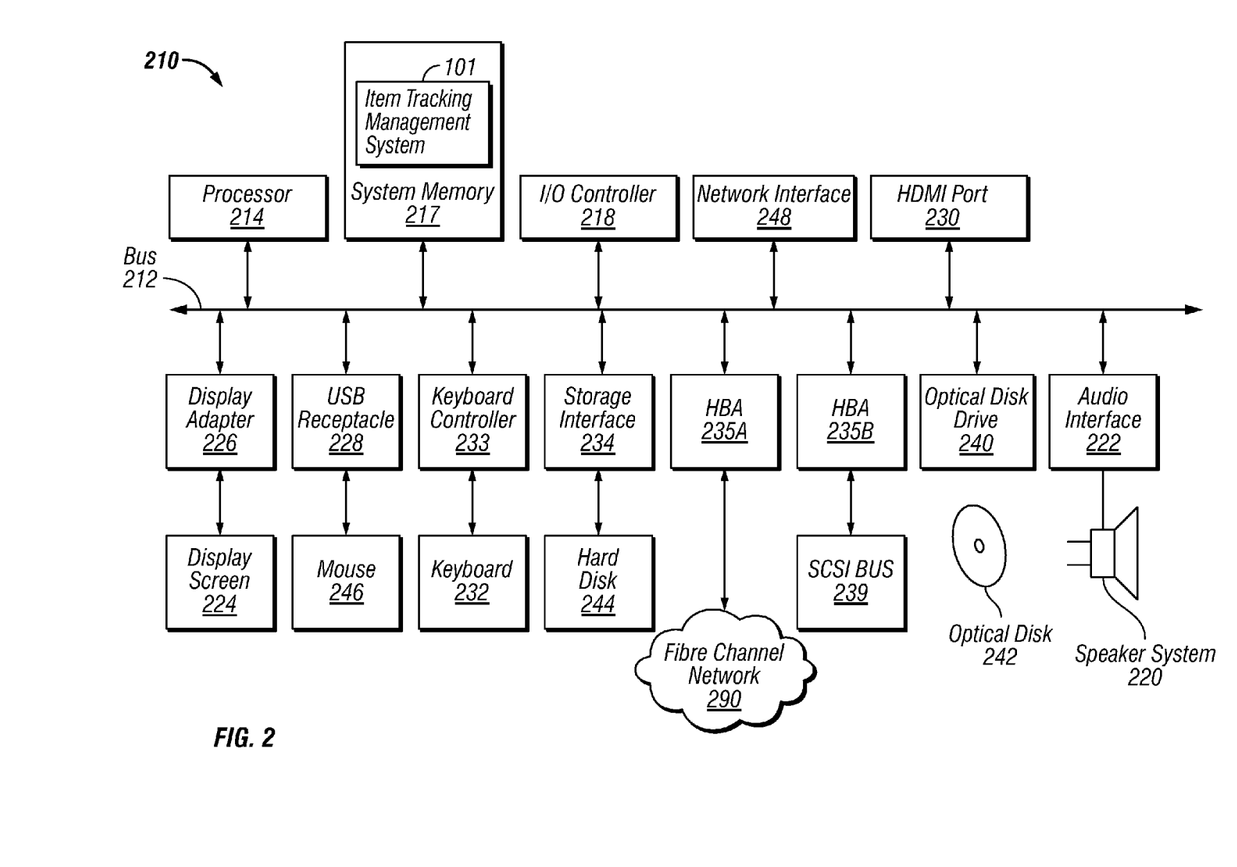
FIG. 2 is a block diagram of a computer system suitable for implementing an item tracking management system, according to some embodiments.

FIG. 2 is a block diagram of a computer system 210 suitable for implementing an item tracking management system 101. Both desktops 115 and mobile computing devices 113 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, HDMI ports 230, etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 113 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248. In FIG. 2, the item tracking management system 101 is illustrated as residing in system memory 217. The workings of the item tracking management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the Internet 109. Mobile computing devices 113 can typically connect to wireless networks using the IEEE 802.11 standards (WiFi), and often have adapters for additional wireless communication protocols such as LTE, BlueTooth, NFC, etc. Smartphones are also typically equipped for voice communication over cellular networks.

Figure 3:
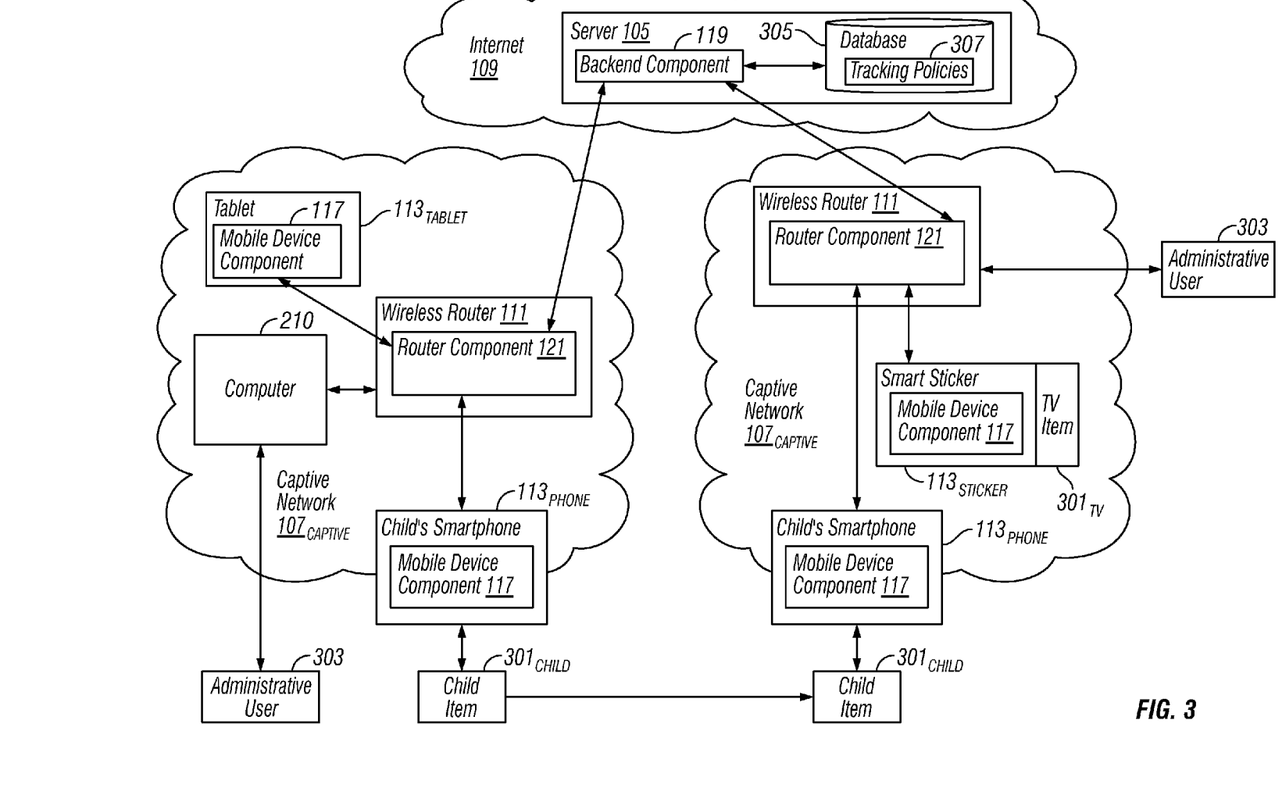
FIG. 3 is a block diagram of the operation of an item tracking management system, according to some embodiments.

FIG. 3 illustrates a router component 121 of an item tracking management system 101 running on the router 111 of each of multiple wireless local area networks 107. The router component 121 (i.e., the router level functionality of the item tracking management system 101) can be instantiated as an application running on a hardware router 111 with a configurable software component. One possible example is DD-WRT aftermarket open source routing firmware (not illustrated), which can run on top of a hardware router 111, and be configured to provide the described functionality. In other embodiments, other implementations are used to build a configurable layer of functionality that runs in conjunction with the hardware and/or software level routing components.

Each router component 121 of the item tracking management system 101 is associated with at least one user 303 with administrative level privileges. As described below, an administrative level user 303 can logon to his/her account on the backend 119 of the item tracking management system 101, register items 301 for tracking, and configure tracking parameters as desired.

Routers 111 tend to be powered on 24/7, making a router 111 a suitable location for certain functions performed by the item tracking management system 101. In other embodiments the router level functionality of the item tracking management system 101 is located on other components, such as a server computer 105 that is communicatively coupled to the router 111. In addition, as described in more detail below, a backend component 119 of the item tracking management system 101 runs in the cloud (e.g., on one or more Internet servers 105), and communicates with router components 121 running on the routers 111 of multiple local WiFi networks 107.

Also illustrated in FIG. 3 is a mobile device component 117 running on each of a plurality of mobile computing devices 113. Under some circumstances, mobile computing devices 113 can move between networks 107, as described in more detail below. A mobile device component 117 can be implemented as an embedded system (or higher level application) on a smart sticker, smart bracelet, smart tile, smart watch or other affixable or wearable computing device. A mobile device component 117 can also be implemented in the form of an app that runs under a mobile operating system, such as iOS, Android, Windows Phone, etc. As described in more detail below, mobile device components 117 have WiFi connectivity, and can connect to local area WiFi networks 107 and communicate with router components 121 of an item tracking management system 101.

As noted above, the functionalities of the router components 121, backend component 119 and mobile device components 117 of the item tracking management system 101 can be implemented on other computing devices, or can be distributed between multiple computer systems 210, including within a cloud-based computing environment in which the functionality of the item tracking management system 101 is provided as a service over a network 107. It is to be understood that although the router components 121, mobile device components 117 and backend component 119 are illustrated in FIG. 3 as standalone entities, each component of the item tracking management system 101 represents a collection of functionalities, which can be instantiated as a single or as multiple modules on one or more computing devices 210 as desired. FIG. 3 illustrates a specific embodiment in which the item tracking management system 101 is instantiated in the form of specific, multiple modules which are located on routers 111, mobile computing devices 113 and a backend server 105. In other embodiments, the functionalities of the item tracking management system 101 are distributed and/or instantiated in other ways.

The modules of the item tracking management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the item tracking management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

The router component 121 on each of the multiple routers 111 establishes and maintains a captive WiFi network $107_{CAPTIVE}$ that is used by appropriately configured mobile computing devices 113 (i.e., mobile devices 113 with a mobile device component 117) in the context of the item tracking management system 101. Each captive network $107_{CAPTIVE}$ is configured for mobile computing devices 117 running a mobile device component 117 to connect automatically without requiring a user 303 to enter any data such as a password. The mobile device components 117 of the connected mobile computing devices 113 communicate with the router component 121, and execute the item tracking functionality described below in detail. The captive network $107_{CAPTIVE}$ does not provide connected devices 113 with access to the Internet or the conventional local area network administrated through the router 111, and computing devices without a mobile device component 117 are not able to connect to the captive network $107_{CAPTIVE}$.

Each router 111 also typically supports a conventional WiFi network 107, to which both computing devices with and without a mobile device component 119 can connect, using whatever conventional protocols the router 111 provides. Computing devices can thus access the private network and/or Internet according to the administered configuration. In addition, the router component 121 itself can use the connectivity provided by the router 111 to communicate with components outside of the captive network $107_{CAPTIVE}$, such as the backend component 119 on the Internet 109.

The item tracking management system 101 can be instantiated across multiple captive networks $107_{CAPTIVE}$, and can be used to track and report the location and movement of items 301 of interest to users 303. FIG. 3 illustrates two captive networks $107_{CAPTIVE}$, but it is to be understood that in practice many more can be deployed. As term is used herein, an item 301 to be tracked means any person, animal or thing which is associated with a specific mobile computing device 113, and which is tracked by the item tracking management system 101 as described herein. Children are one example of a type of animate item 301 that can be tracked. In addition to children, tracked items 301 can be in the form of other categories of people under the jurisdiction of another party, such as hospital patients or nursing home residents. Pets, livestock and monitored wildlife are other examples of living items 301 that can be tracked by the item tracking management system 101. Whether people, pets or other types of animals, animate items 301 are tracked via mobile computing devices 113 that are affixed/attached thereto or worn/carried thereby.

Inanimate items 301 can also be tracked, including both items 301 which are themselves mobile computing devices 113 such as smartphones, tablets, smart cameras and the like, as well as those to which a mobile computing device 113 can be affixed or attached, such as video or audio equipment, vehicles, wallets, etc. One form of mobile computing device 113 that can be used in this capacity is a smart sticker $113_{STICKER}$, which can be affixed to both animate and inanimate items 301. In the case of a person, a smart bracelet $113_{BRACELET}$ worn by the party in question can be used. Another option in this case is the use of the person's own smartphone, tablet or the like. Animals can be outfitted with smart collars or tags. These are just examples of mobile computing devices 113 used within the context of the item tracking management system 101 in some embodiments.

In order to configure the item tracking management system 101 to track a specific item 301, a user 303 logs-on to the backend component 119 as an administrator, using a username and password (or in different embodiments, other more robust authentication mechanisms). The authenticated user 303 interacts the item tracking management system 101 (typically at the backend level, through a user interface), and registers the specific mobile computing device 113 with the item tracking management system 101. In one embodiment, the administrative user 303 registers mobile devices 113 through a web interface accessed via a browser, although this is just one implementation specific example.

At registration time, the backend component 119 can provide the mobile device component 117 with a mechanism for securely identifying itself to the captive network $107_{CAPTIVE}$, such as provisioning a certificate pair to the mobile computing device 113. The registered mobile device 113 can then connect automatically to supported captive networks $107_{CAPTIVE}$ by transmitting the authentication information, without requiring a password or other user entered data.

Part of the registration process involves associating the specific mobile computing device 113 with an item 301 of a given type. Whenever the user 303 registers a mobile computing device 113, an associated item 301 and/or item type is determined or specified. For example, the administrative user 303 could specify that a given smartphone $113_{PHONE}$ being registered is carried by a specific child named John Smith, in which case the mobile computing device 113 is associated with a specific item 301 of the type child, the specific instance having the provided name. In another example, the provided registration information could indicate that the mobile computing device 113 (e.g., a specific smart sticker $113_{STICKER}$) is being attached to a specific television set (item type=TV) with a specific serial number which identifies the instance. Recall that a mobile computing device 113 can itself be the tracked item 301 (e.g., a specific smartphone, tablet or sensor can be registered and tracked). In this case, the registered device 113 and the tracked item 301 are one and the same.

The categorization information concerning an item 301 being associated with a given mobile computing device 113 can be at any desired level of granularity. Typically, in addition to (or in some instances instead of) identifying a specific item 301 (e.g., by an alphanumeric label such as a name or identification number), the categorization information concerning a given item includes an item type. The item type can be entered and/or determined at the time of registration. For example, the user 303 can be prompted to enter some categorization information specifying the item's type at the time a given mobile computing device 113 is registered (e.g., whether the associated item 301 is a person, pet, vehicle, television, etc.). The specific item types utilized can vary between embodiments as desired, and can be at any desired level of granularity.

Mobile devices 113 such as smart stickers, bracelets and the like can have different appearances (e.g., colors, shapes, etc.) for different common types of items (e.g., blue for people, red for pets, orange for dynamic objects and green for static objects). Such mobile devices 113 can also be equipped with QR codes, bar codes or other scannable labels encoding this information for use during registration. The association between the device 113 being registered and an item type can thus be gleaned automatically by scanning the code during the registration process.

The backend component 119 maintains a record of each registered device 113 and its associated item 301, along with the associated categorization information and tracking policy 307 (tracking polices 307 are described in more detail below). The backend component 119 can utilize a database 305 (or other suitable storage mechanism) for maintaining these records. The backend component 119 can identify specific mobile computing devices 113 by any unique identifier, such as MAC address, hardware id, phone number, etc. In some instances, the router component 121 automatically gleans identifiers of mobile computing devices 113 being registered when the devices 113 communicate with the router 111, and passes this information to the backend component 119. In other instances, this information can be entered by the user 303 or scanned from a label on the mobile computing device 113.

The administrative user 303 can select, define, specify and/or edit tracking policies 307. Tracking policies 307 can comprise, for example, rules to enforce for specific items 301 and/or item types that are registered with the item tracking management system 101, whitelists and/or blacklists of permitted and forbidden locations, selected and/or specified actions to take when rules are met or broken (e.g., alert the administrative user 303, disable the device 113), specified and/or default communication preferences for alerts (e.g., text, email, phone call), etc. In some embodiments much of the association of tracking policies 307 with items 301 can be automated. The backend component 119 can provide default configurations and tracking policies 307 for common item types, with default rules and desired actions provided to make the configuration process easier. For example, the user 303 can be presented with a default policy template for the selected or specified item type, which the user 303 can then edit or customize as desired.

Many inanimate items 301 such as large electronics (e.g., tagged with a smart sticker $113_{STICKER}$) or certain smart items in the home which are themselves computing devices 113 (e.g., smart sensors, thermostats, carbon monoxide or smoke detectors, alarm systems, sprinkler controllers, etc.) would be expected to remain at a single location, so a default policy 307 for many item types such as these could be to notify the user 303 if the item 301 is moved from the house (identified, for example, by a set of geo-coordinates covering a desired localized range) at any time.

Some types of inanimate items would be expected to move about within certain limitations and under certain conditions. Thus, default tracking policies 307 for these types of items (e.g., smartphones, tablets, laptops, cars, bicycles) could allow for movement between locations, but trigger alerts if certain types of activities commonly associated with theft or other unauthorized use occur. What specific activities would trigger such alerts can vary between embodiments and item types, but some examples are movement at times of the night or day when the item could be expected to be stationary, movement into certain areas associated with the sale of stolen goods, movement into unknown locations, etc.

Default tracking policies 307 for animals can vary based on the animal type (e.g., indoor cat versus outdoor dog versus stabled horse versus free range cow), with each default policy 307 providing a set of rules allowing for expected ranges of motion for the specific type of animal under typical circumstances. Note that the specific default tracking policies 307 to be provided for different item types can vary between embodiments and can be updated as desired, based on factors such as current market research, user feedback or gathered usage data concerning behaviors associated with different types of items over time.

Default tracking policies 307 can also be provided for children. For example, a default rule could specify that in the case of all children 301 moving between two authorized locations (e.g., home and school), the travel must be completed in an approved amount of time, which can be calculated automatically based on the distance between the two points and mode of transport (e.g., walking, bike riding, etc.) or specified by the user 303 (e.g., the parent or other responsible adult). This is just an example of one possible default rule for children according to one embodiment.

Default tracking policies 307 can also be preconfigured with a set of default actions to take when specific rules are met or broken, depending upon the circumstances and severity (e.g., send an instant message or other form of alert to the user 303, alert local law enforcement, etc.). For example, a rule stating that a child 301 must reach a given destination within, e.g., thirty minutes of departure from the house, being ten minutes late could be classified as a low severity breach, being thirty minutes late a medium severity breach and being more than an hour late a high severity breach, each of which could be associated with different consequential actions as desired. For example, the low severity breach could result in an instant message being sent to the child, a medium severity breach could result in an email being sent to the parent and a high severity breach could result in law enforcement being notified.

Administrative level users 303 can configure the item tracking management system 101 as desired, editing tracking policies 307 (e.g., by adding new rules and/or modifying old ones), overriding or reverting to defaults, associating new mobile devices 113 with specific items 301, selecting or changing notification preferences, etc. In general, tracking policies 307 specify conditions that warrant alerts regarding tracked items 301. Both the specific conditions and the targets and form of any resulting alerts can vary according to item type, can be supplied by defaults and/or can be specified and/or edited by the user 303 as desired.

Tracking policies 307 can be customized to include geofencing and timing criteria at any level of granularity. For example, a parent can specify that s/he is to be notified if a specific child being tracked leaves a permitted (e.g., whitelisted) area, such as the house, the yard, the block or the library, or goes to a specific prohibited (e.g., blacklisted) location that the child is not allowed to go to. A parent could create a rule that specifies, for example, that a child is allowed to be present at any of three locations (e.g., the homes of two different approved friends or the park) during a set time period, is never allowed within 100 feet of a particular house, and is expected to be home for dinner at a particular hour. Any combination of locations and time windows can be permitted, required and/or prohibited, resulting in alerts of a specified format being transmitted to a given target if the conditions are not met.

In addition to default policy templates and manual specifications, machine learning can be used to recognize standard patterns for certain items and item types over time, and tracking policies 307 can be updated accordingly. In this case, alerts can be generated in response to the detection of deviation from the learned norms. The specific statistical criteria to utilize to identify norms and acceptable degrees of deviation therefrom can vary between embodiments. Tracking policies 307 can also enable pre-emptive warnings in response to tracking an item 301 as being on a trajectory towards breaking a rule (e.g., the child is heading towards a forbidden or dangerous location). Determination of factors such as what constitutes a dangerous location can be statically specified, but can also be dynamically determined from realtime data, such as crime reports, news feeds, social media, health alerts, etc.

In order to execute the tracking functionality described herein, network item tracking management system 101 enabled mobile computing devices 113 detect and connect to captive networks $107_{CAPTIVE}$. When a mobile device component 117 detects an item tracking management system 101 enabled captive network $107_{CAPTIVE}$, the mobile component 113 automatically connects to the router component 121, which in turn reports the connection by the specific mobile device 113 to the backend component 119. When a mobile device component 117 disconnects (either because the mobile device 113 goes out of range or is turned off, or because the mobile device component 117 proactively disconnects), the router component 121 reports this to the backend component 119 as well.

In different embodiments, the mobile device component 117 can use different criteria to determine when to switch connections between neighboring item tracking management system 101 enabled captive networks $107_{CAPTIVE}$. For example, in one embodiment if more than one captive network $107_{CAPTIVE}$ is in range, the mobile device component 117 can connect to the one with the strongest signal, and then switch if the signal of the captive network $107_{CAPTIVE}$ to which it is currently connected becomes weaker than another available signal by a given threshold of measurement, thus switching connections as the mobile device 113 is moved between locations. The specific criteria to use in making connection switching decisions can vary between embodiments.

As explained above, when a given mobile computing device 113 associated with a specific item 301 connects to or disconnects from an item tracking management system 101 enabled captive network $107_{CAPTIVE}$, the router component 121 reports the connection event to the cloud based backend component 119. As various item tracking management system 101 enabled mobile computing devices 113 are moved about, the corresponding connection events on multiple captive networks $107_{CAPTIVE}$ are reported to the backend component 119. The backend component 119 is able to use this reported information to track the movement and other behaviors of multiple items 301 over time, and enforce the tracking policies 307 associated therewith. More specifically, when the backend component 119 receives a notification from a given router component 121 reporting the occurrence of a specific connection event, the backend component 119 can consult the corresponding tracking policy 309 (i.e., the tracking policy concerning the tracked item 301 associated with the mobile computing device 113 that executed the reported connection event). As described in more detail above and below, based on factors such as the location and time of the connection event, the backend component 119 can determine whether the tracking policy 307 dictates that an alert be transmitted to the administrative user 303 or another party. In other words, the backend component 119 determines whether the connection event indicates that an activity has occurred that necessitates informing the user 303 (or another party), such as a static item 301 (e.g., a stereo system) being moved outside of a permitted location (e.g., the owner's home), a child $301_{CHILD}$ returning home late, a smartphone $113_{PHONE}$ being more than an expected distance from a base location, etc. As explained above, tracking polices 307 specify conditions under which alerts are to be generated. When reported connection events indicate such conditions have been met, the backend component 119 transmits the appropriate alerts.

Note that the reporting of connection events will use relatively little processing power or network bandwidth, as such an event only occurs when the connection status of an item tracking management system 101 enabled mobile computing device 113 changes, and the reporting of the event from the router component 121 to the backend 119 requires the transmission of only a small amount of data identifying the mobile device 113.

As described above, each item tracking management system 101 enabled router 111 is associated with an administrative level user account, and thus backend component 119 can use corresponding account information to glean the address/physical location of the router 111, and hence the location at which a reported connection event occurred. For example, the account information can include the address, credit card data or other location specific registration information. In another embodiment, the router component 121 can report its location to the backend component 119, for example during an initial handshake operation when the router component 119 is initially configured. The router component 119 can know its location from, for example, a GPS receiver on the router 111 or on a physically proximate connected computer 210, or from WiFi MAC scanning or the like.

In some embodiments, the mobile device component 117 can be utilized to detect the current location of the mobile device 113, and report that information to the router component 121 which in turn passes it to the backend 119. Many mobile computing devices 113 have the ability to determine their current physical location. Different mechanisms can be used to determine the current physical location of a mobile computing device 113 depending upon its capabilities. These mechanisms can be classified as providing either "fine" or "coarse" positions respectively. Fine location data is provided by Global Positioning System ("GPS") receivers on the mobile computing devices 113 where available, whereas coarse location data is provided by WiFi or cell tower triangulation. GPS position data is very accurate, but a GPS receiver is slow to acquire a signal, and signals are not available inside most buildings, tunnels, or within urban areas with densely packed high-rises. Additionally, not all mobile computing devices 113 are equipped with GPS receivers.

WiFi triangulation is done by comparing the relative strength of nearby WiFi devices as measured by the mobile computing device 113 to previously recorded readings. These previous readings were typically taken by vehicles that recorded signal strengths while being driven through the area. The data recorded by these vehicles is not very accurate because the vehicles can only travel on public streets, and thus often take readings from a location that is further from a given WiFi device than the mobile device 113 in question. Additionally, the signal measuring vehicles are not able to frequently return to and rescan previously scanned areas, and thus stored readings are often not current. Some companies supplement the vehicle gathered WiFi data with data recorded by certain mobile devices 113 (e.g., Android devices) as users move around. This new source of data is helpful, but WiFi triangulation still has its shortcomings because the mobile device 113 might not be able to detect many WiFi devices/access points while trying to obtain a fix on its current location. Cell tower triangulation uses cell phone tower signals rather than WiFi device signals, but is otherwise similar to WiFi triangulation and thus creates the same concerns, plus not all mobile computing devices 113 have cellular communication capability. Other types of fixed position wireless devices can also be used for triangulation, and such use results in the same concerns as WiFi and/or cell phone tower triangulation.

In addition to connecting to item tracking management system 101 enabled captive networks $107_{CAPTIVE}$, the mobile device component 117 can perform other functions as well. For example, in one embodiment the mobile device component 117 communicates with the backend 119 through the router component 121 and securely requests and receives software, firmware and/or data updates as they become available. In one embodiment, the mobile device component 117 checks in with the backend 119 periodically, to determine whether the mobile device or associated item 303 has been reported stolen, missing, or restricted for other reasons. In such a case, the mobile device component 113 can take a desired action in response, such as disabling all functionality aside from continuing to report its location. These are just examples of additional mobile device component level functions that can be provided in addition to connectivity and location reporting.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A method implemented on a backend server computer for tracking location and behavior of a plurality of both animate items and inanimate items, and enforcing tracking policies concerning the plurality of items based on detected spatiotemporal events over time, the method comprising:
   receiving, by the backend server computer, registration information concerning multiple mobile computing devices, the registration information concerning each mobile computing device comprising an identifier of an associated item to be tracked and categorization information concerning the associated item to be tracked;
   maintaining, by the backend server computer, a record concerning each registered mobile computing device, each record comprising an identifier of the specific registered mobile computing device, an identifier of the corresponding associated item, and categorization information and a tracking policy concerning the corresponding associated item;
   receiving, by the backend server computer, notifications from multiple ones of a plurality of routers each of which maintains an associated captive network, each received notification indicating that a specific registered mobile computing device has executed a connection event on a specific captive network;
   in response to received notifications, tracking locations of items over time, by the backend server computer;
   determining, by the backend server computer, when the tracking policy associated with a specific tracked item indicates to transmit an alert to a given user under a current set of circumstances indicated by the tracking step;
   transmitting alerts to target users concerning tracked items, by the backend server computer, in response to results of the determining step.

2. The method of claim 1 wherein receiving registration information concerning a specific mobile computing device further comprises:
   receiving, by the backend server computer, user entered categorization information concerning a specific item to be tracked, the specific item to be tracked being associated with the specific mobile computing device.

3. The method of claim 1 wherein receiving registration information concerning a specific mobile computing device further comprises:
   receiving, by the backend server computer, categorization information gleaned automatically by scanning a label on the specific mobile computing device.

4. The method of claim 1 wherein receiving registration information concerning a specific mobile computing device further comprises:
   receiving, by the backend server computer, specifications concerning the tracking policy concerning a specific item to be tracked, the specific item to be tracked being associated with the specific mobile computing device.

5. The method of claim 1 further comprising:
   supplying, by the backend server computer, a default tracking policy concerning a specific item to be tracked, the default tracking policy being based on categorization information concerning the specific item to be tracked.

6. The method of claim 5 further comprising:
   receiving, by the backend server computer, edits from a user to the supplied default tracking policy concerning the specific item; and applying, by the backend server computer, the received edits to the default tracking policy concerning the specific item to be tracked.

7. The method of claim 1 further comprising:
in response to receiving registration information concerning a specific mobile computing device, providing the specific mobile computing device with authentication information configured for the specific mobile computing device to automatically connect to a captive network without requiring user entered data.

8. The method of claim 1 further comprising:
receiving, by the backend server computer, a notification from a specific router indicating that a specific registered mobile computing device has executed a connection event on a specific captive network; and
gleaning, by the backend server computer, a current location of an item to be tracked associated with the specific registered mobile computing device based on a location of the specific router.

9. The method of claim 8 wherein gleaning the current location of the item to be tracked associated with the specific registered mobile computing device based on the location of the specific router further comprises:
receiving, by the backend server computer from the specific router, the location of the specific router as determined a Global Positioning System (GPS) receiver at the level of the specific captive network.

10. The method of claim 8 wherein gleaning the current location of the item to be tracked associated with the specific registered mobile computing device based on the location of the specific router further comprises:
gleaning, by the backend server computer, the location of the specific router based on registration information received from an administrative user.

11. The method of claim 1 further comprising:
receiving, by the backend server computer, a notification indicating that a specific registered mobile computing device has executed a connection event on a specific captive network;
wherein the notification comprises a current location of the specific mobile computing device, the current location having been determined and supplied by the specific mobile computing device itself.

12. The method of claim 1 further comprising:
utilizing machine learning, by the backend server computer, to recognize usage patterns for at least one specific type of item over time; and
updating at least one corresponding tracking policy, by the backend server computer, in response to recognized usage patterns.

13. The method of claim 1 further comprising:
determining, by the backend server computer, that the tracking policy associated with a specific tracked item indicates to transmit an alert to a given user, in response to determining that the specific item to be tracked has moved outside of a permitted location.

14. The method of claim 1 further comprising:
determining, by the backend server computer, that the tracking policy associated with a specific tracked item indicates to transmit an alert to a given user, in response to determining that the specific item to be tracked has moved into a forbidden location.

15. The method of claim 1 further comprising:
determining, by the backend server computer, that the tracking policy associated with a specific tracked item indicates to transmit an alert to a given user, in response to determining that the specific item to be tracked has not moved into a specific location by a specific time.

16. The method of claim 1 further comprising:
determining, by the backend server computer, that the tracking policy associated with a specific tracked item indicates to transmit an alert to a given user, in response to determining that the specific item to be tracked has not moved out of a specific location by a specific time.

17. A method implemented on a mobile computing device for tracking location and behavior of an associated item and enforcing a tracking policy concerning the associated item over time, the method comprising:
detecting, by the mobile computing device, a first captive wireless network within connection range;
automatically connecting to the first captive wireless network, by the mobile computing device;
detecting, by the mobile computing device, a second captive wireless network within connection range, wherein the second captive network has a signal stronger than that of the first captive network;
automatically disconnecting from the first captive wireless network, by the mobile computing device, in response to detecting the second captive wireless network;
automatically connecting to the second captive wireless network, by the mobile computing device, in response to detecting the second captive wireless network;
wherein the first captive wireless network and the second captive wireless network report connection events concerning the mobile computing device to a backend server computer, such that the backend server computer tracks a current location of the item associated with the mobile computing device over time, determines when the tracking policy associated with the item indicates to transmit an alert to a user, and transmits the alert to the user concerning the item.

18. The method of claim 17 further comprising:
periodically determining a current physical location, by the mobile computing device; and
periodically transmitting, to a backend server computer by the mobile computing device, the determined current physical location for use by the backend server computer in tracking the location of the associated item over time.

19. The method of claim 17 further comprising:
periodically requesting updates from a backend server computer by the mobile computing device;
receiving at least one update from the backend server computer by the mobile computing device; and
installing the at least one received update, by the mobile computing device.

20. The method of claim 17 further comprising:
receiving a notification, from a backend server computer by the mobile computing device, the received notification indicating that the mobile computing device has been reported stolen; and
disabling all local functionality by the mobile computing device, other than periodically transmitting current physical location information to the backend server.

21. The method of claim 17 wherein:
the mobile computer device consists of a wearable computing device and the associated item to be tracked consists of a child, wherein the child wears the wearable computing device.

22. A method implemented on a router for tracking location and behavior of a plurality of both animate items and inanimate items, and enforcing tracking policies concerning the plurality of items based on detected spatiotemporal events over time, the method comprising:

maintaining, by the router, a captive wireless network to which mobile computing devices provisioned with corresponding authentication credentials automatically connect;

detecting, by the router, when given mobile computing devices connect to and disconnect from the captive wireless network;

reporting, to the backend server computer, connections of given mobile devices to and disconnections of given mobile devices from the captive network, such that the backend server computer tracks locations of items associated with the given mobile computing devices over time, determines when a tracking policy associated with a specific item indicates to transmit an alert to a user, and transmits alerts to users concerning tracked items.

* * * * *